No. 754,090. PATENTED MAR. 8, 1904.
J. POWERS.
AUTOMATIC PHOTOGRAPHIC APPARATUS.
APPLICATION FILED APR. 24, 1903.
NO MODEL. 5 SHEETS—SHEET 1.

James Powers, Inventor

No. 754,090. Patented March 8, 1904.

UNITED STATES PATENT OFFICE.

JAMES POWERS, OF NEW YORK, N. Y., ASSIGNOR TO ROBERT J. LOUIS AND HARRY B. THEARLE, OF NEW YORK, N. Y.

AUTOMATIC PHOTOGRAPHIC APPARATUS.

SPECIFICATION forming part of Letters Patent No. 754,090, dated March 8, 1904.

Application filed April 24, 1903. Serial No. 154,138. (No model.)

*To all whom it may concern:*

Be it known that I, JAMES POWERS, a citizen of the United States, residing at New York city, in the county of New York and State of New York, have invented a new and useful Automatic Photographic Apparatus, of which the following is a specification.

This invention relates to a novel photographic apparatus of that type which is characterized by automatically-operating mechanisms for presenting successive plates in position for exposure and for thereafter effecting the development of the photographic image and the delivery of the picture from the machine.

The invention has for its object to minimize the time consumed by the manipulation of the plate after it is exposed in order that a larger number of pictures may be taken and delivered in a given time than is ordinarily possible.

A further object of the invention is to simplify the construction of the machine as a whole and to control the various coöperating devices contributing to the production of the photograph from a single power-shaft provided with cams for properly timing the various operations and capable of being driven in any suitable manner—as, for instance, by a mechanical, electrical, or other motor, or manually, as by means of a crank exposed upon the exterior of the casing within which the machine is mounted.

Subordinate to these recited objects are various others to be made apparent during the succeeding description of that embodiment of the invention which for the purpose of this disclosure is illustrated in the accompanying drawings.

In said drawings.

Like characters are employed to designate corresponding parts throughout the views.

The particular machine herein illustrated is arranged to be coin-controlled and is inclosed within a suitable casing 1, provided with a coin-slot 2, in which a coin is designed to be deposited by the person desiring to have his picture taken by the machine.

Within the casing is supported a base 3, from which rises a frame 4, comprising a pair of parallel vertical castings 5, rigidly connected in spaced relation by a series of tie-bars 6, extending between the castings at such points as will insure the necessary rigidity of the frame without bringing the tie-bars into obstructive relation with any of the moving parts.

At the rear end of the frame 4 is journaled a horizontal power-shaft 7, driven by a motor 8 when released by the actuation of the check-controlled mechanism upon the deposit of a coin in the slot. The shaft 7 constitutes a driving member common to the various operating devices concerned with the manipulation of the photographic plate.

Adjacent to the front of the machine-frame and in a plane somewhat higher than the shaft 7 is mounted a lens-tube 9, supported by a bracket 10, rigid with the frame and equipped with a sliding shutter 11, designed to be operated in a manner to be hereinafter described.

Extending inwardly through an opening in the front wall of the casing is a funnel-shaped light-concentrator 12, having its smaller end in coincidence with the front end of the lens-tube and having its interior surface polished in a manner and for a purpose well understood by those skilled in the art.

In rear of the lens-tube 9 is located a swinging plate-holder 13, comprising a shaft 14, journaled in the opposite sides of the frame, and angular arms 15, arranged in parallel relation and extending laterally from the shaft.

The arms 15 of the holder are provided with opposed grooves or guideways 16, designed for the reception of the opposite side edges of a photographic plate, which latter having been delivered to the holder is frictionally retained therein by a pair of plate-retaining springs 17, secured to the shaft and bearing against the under or back side of the plate.

Figures 6, 7, 8, 9, 13:
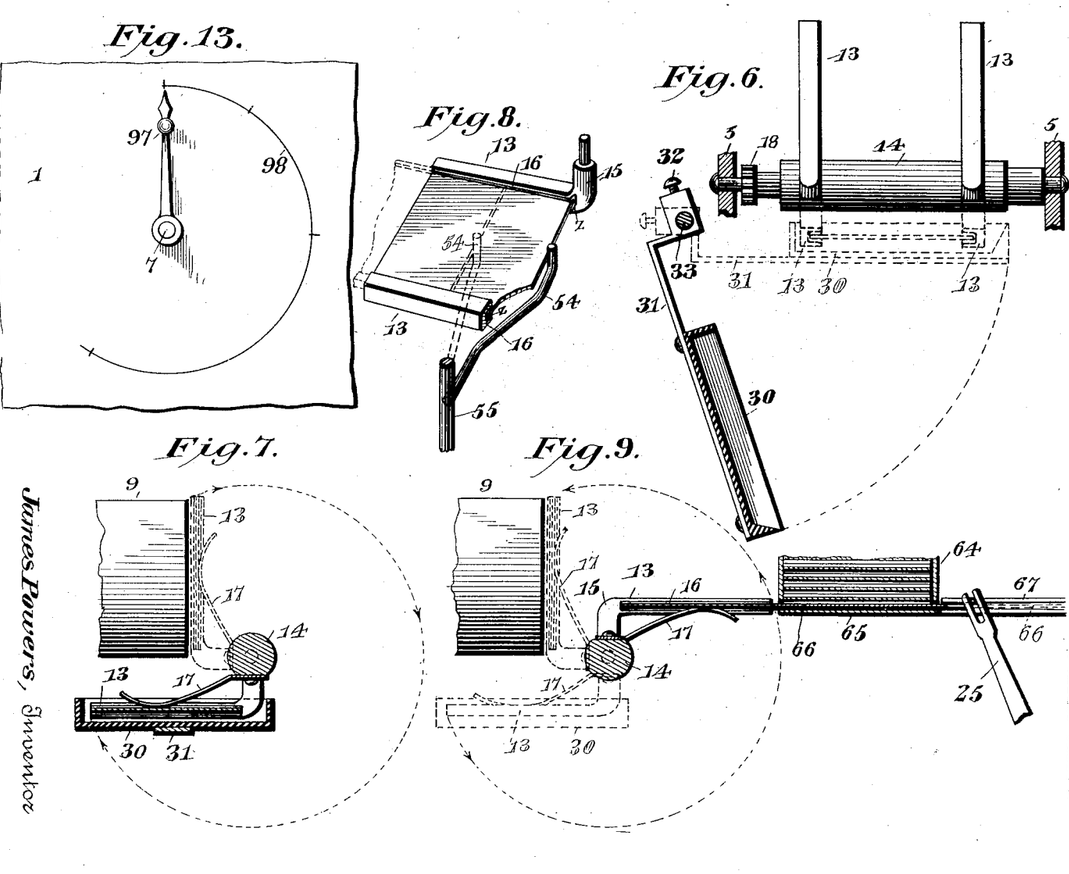
Fig. 6 is a detail view, partly in section, showing the relation of the plate-holder and developing-pan in the normal positions of these parts and indicating in dotted lines the relative positions thereof when by their combined movements the parts are presented in position to submerge a plate in the developing-bath.
Fig. 7 is a detail sectional view showing the relative positions assumed by the pan and plate-holder during the development of the plate, the normal position of the holder being indicated in dotted lines and the direction of movement of the plate-holder from its normal position to the pan being indicated by dotted arrows.
Fig. 8 is a detail perspective view showing the plate-ejector in position to eject the developed plate from the plate-holder as the developing-pan swings down to its normal position from the position shown in Fig. 7.
Fig. 9 is a detail sectional view showing the plate-holder disposed to receive a new plate from the magazine after having moved back, as indicated by dotted arrows, from the position it occupied during the ejection of a plate, this latter position of the plate-holder, as well as the normal position thereof to which it moves after having received a plate, being indicated in dotted lines.
Fig. 13 is a side elevation of a portion of a casing, illustrating a crank which may be employed for the manual actuation of a machine.

By reference to Figs. 7 and 9 it will be noted that the angular form of the plate-holder arms results in offsetting from the shaft that portion of the holder which receives and supports the plate. As a consequence of this peculiarity the plate is held in the normal position of the holder in a vertical plane in advance of the shaft 14 and in another position of said holder in a horizontal plane below the shaft. The particular utility of this arrangement will presently appear.

Adjacent to one end thereof the shaft 14 is provided with a pinion 18, enmeshed with a comparatively large gear-wheel 19, keyed or otherwise secured upon a transverse shaft 20, journaled in the machine-frame and extended beyond one side thereof to facilitate the attachment of a holder-retracting arm 21. (See Figs. 2 and 4.) The arm 21 is constantly urged in one direction by a holder-retracting spring 22, secured at one end to the arm and at its opposite end to the frame of the machine, as indicated at 23.

Figures 2, 10:
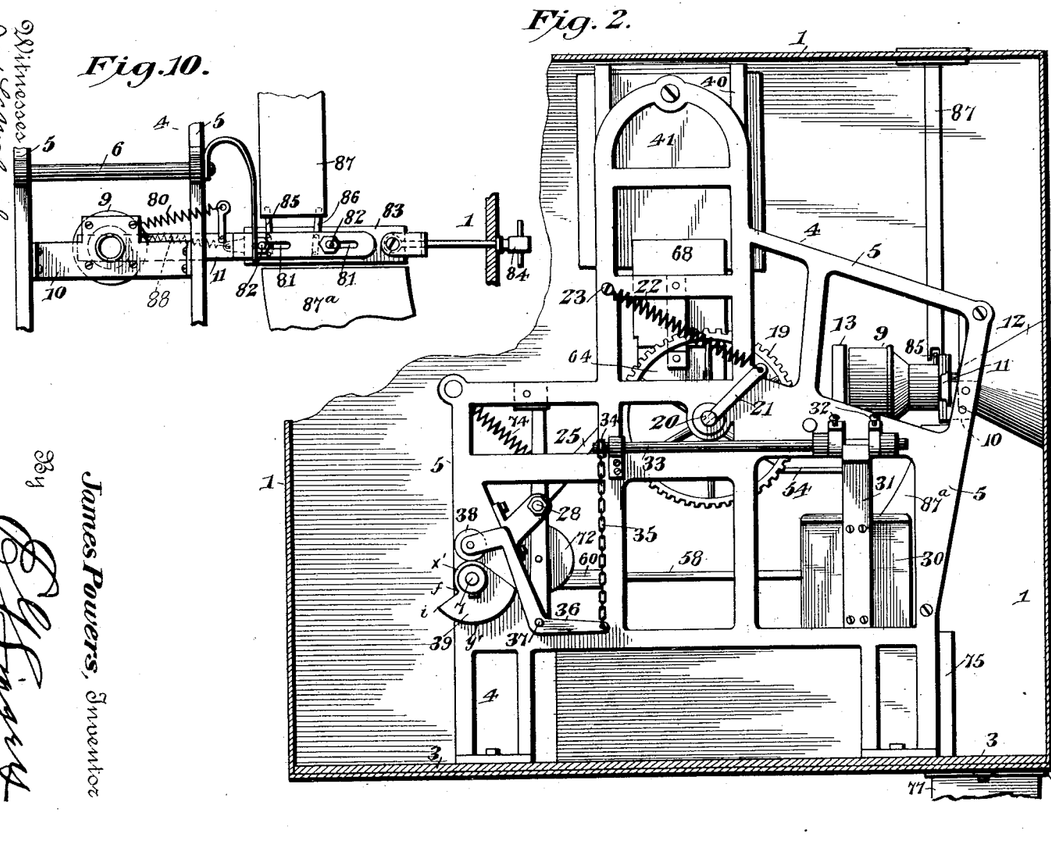
Fig. 2 is a similar view showing the opposite side of the machine.
Fig. 10 is a front elevation of the shutter-operating mechanism.
Figures 4, 5:
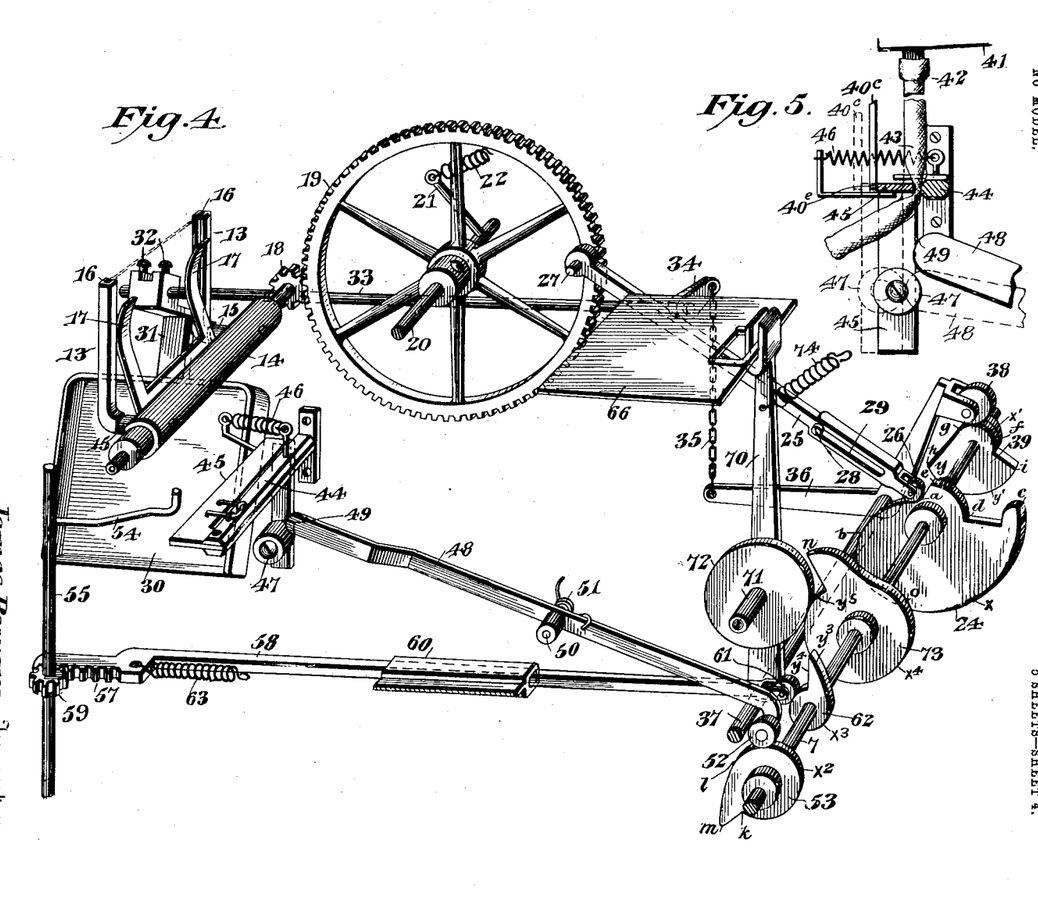
Fig. 4 is a perspective view showing the various moving parts of the machine grouped in order that the relation of the various coöperating devices with respect to each other and to their common operating mechanism may be clearly apparent.
Fig. 5 is a detail sectional elevation of the valve mechanism controlling the supply of the developing fluid to the developing-pan.

As will be seen by reference to the figures just indicated, the spring 22 constantly tends to rotate the wheel 19 in a direction to insure the retention of the plate-holder in its normal vertical position at the rear end of the lens-tube or to return the holder to such position if unrestrained.

The plate-holder is moved away from its normal position in opposition to the spring 22 by the cam 24, fixed to the shaft 7 and disposed to engage and operate a tappet-rod 25, provided at one end with a roller 26, traveling upon the periphery of the cam 24 and having connection at its opposite end with a wrist-pin 27, extending laterally from the wheel 19.

The tappet-rod 25 is guided in its longitudinal movement by a guide-pin 28, projecting from the frame of the machine and engaging a longitudinal slot 29 in the rod. The pin 28 retains the rod against lateral movement and compels its movement in a longitudinal direction as the cam 24 rotates. The first movement of the plate-holder 13 is from the normal vertical position indicated in Fig. 4 to the horizontal position below the shaft 14, (indicated in full lines in Fig. 7,) the extent of this movement being indicated by the dotted arrows in the latter figure. When the holder has reached the limit of its first movement, the plate will be in position to be developed, and as it must necessarily remain in the developing solution for some little time the cam 24 is formed with a rise extending from $a$ to $b$ for imparting the necessary movement to the holder and with a dwell extending from $b$ to $c$ to permit the plate-holder to remain at rest during the period necessary for the development of the plate. The next movement of the plate-holder is a retractile movement from the position shown in full lines in Fig. 7 to that shown in full lines in Fig. 9, the latter being the position assumed by the holder for the reception of a new plate, the plate formerly held having been ejected in a manner to be hereinafter described prior to the return of the holder to the receiving position. To permit this retractile movement of the plate-holder, the cam 24 is provided with a drop from $c$ to $d$, so that as the extremity $c$ of the dwell $x$ reaches the end of the tappet-rod 25 the latter will be unobstructed and will permit the spring 22 to turn back the wheel 19, and thus swing back the plate-holder to the receiving position, where it is retained for a period sufficient for the reception of the plate by a second dwell $y$, extending from $d$ to $e$ of the cam 24. By the time the end $e$ of the dwell $y$ reaches the end of the tappet-rod 25 the plate will have been completely received by the holder, and as the cam is provided with a second drop extending from the end $e$ of the dwell $y$ to the lower or inner end $a$ of the rise the spring 22 will be permitted to complete the retraction of the plate-holder to its normal vertical position just as the shaft 7 has made one complete revolution.

The plate-holder is the first of the several operating devices to move, and it is for this reason that the description of this element and its operating mechanism has been first recited.

The second device brought into action is the developing-pan 30. (See Figs. 4 and 6.) This pan is a shallow receptacle of just sufficient size to accommodate the plate-holder and is carried by an angular pan-supporting arm 31, secured, as by set-screws 32, to a rock-shaft 33, journaled in suitable bearings and extending longitudinally of the machine-frame beyond one side thereof. Normally the developing-pan 30 occupies a pendent position beyond one side of the plane of movement of the plate-holder, (see Fig. 6,) the purpose being to so arrange the pan that the plate-holder may move without opposition to a horizontal position below its shaft, from which position the plate may after development be conveniently ejected toward the front of the frame. The pan, however, is designed to be swung up to a horizontal position directly under the plate-holder, (see dotted-line position in Fig. 6 and full-line position in Fig. 7,) and in order to economize the time consumed in the handling of the plate this upward movement of the pan begins during the movement of the plate-holder, the movements of these parts being so timed that while they do not interfere with each other they arrive nearly simultaneously in the positions indicated in Fig. 7.

The desired movement of the pan is secured in the following manner: To one end of the rock-shaft 33 is secured a crank-arm 34, having suitable connection, as by means of a chain 35, with one end of a bell-crank lever 36, secured upon a transverse shaft 37, journaled in the frame and extended beyond one side thereof for the attachment of the lever 36. At the end of the lever 36 opposite its attachment to the chain 35 is mounted an antifriction-roller 38, disposed to ride upon the periphery of a pan-operating cam 39, keyed upon the shaft 7 in a predetermined relation to the various other cams thereon. The cam 39 is formed with a dwell $x'$, extending from $f$ to $g$, with a rise extending from $g$ to $h$, with a second dwell $y'$, extending from $h$ to $i$, and with a drop from $i$ to the first end $f$ of the dwell $x'$. Normally the roller 38 rests upon the dwell $x'$ at a point intermediate of the ends thereof, since it is desired that the plate-holder complete a considerable portion of its movement before the pan begins to rise.

When the shaft 7 is set in motion, the holder immediately begins to move down, as heretofore described; but the pan remains at rest until the movement of the cam 39 brings the rise thereof into contact with the roller 38. Continued movement of the shaft will obviously swing the bell-crank lever and through the intermediate connection will rock the shaft 33 to elevate the pan from its normal pendent position to the horizontal position shown in Fig. 7. As the rise of the cam is gradual, the pan will move up with just sufficient speed to present it immediately under the holder just as the latter reaches the limit of its movement. The holder containing a plate which has been exposed will now be located within the pan, and this relation of the parts will be maintained for a sufficient length of time to permit the development of the plate, for the reason that the lower end of the tappet-rod 25 will be opposed to the dwell $x$ of the cam 24, and the roller 38 will be opposed to the dwell $y'$ of the pan-actuating cam 39. The pan must begin its downward or retractile movement in advance of the holder in order to permit the operation of an ejector, which, as heretofore intimated, ejects the developed plate from the holder before the latter begins its retraction. For this reason the cam 39 is so proportioned that the roller 38 of the bell-crank lever 36 will reach the end of the dwell $y'$, and thus permit the pan to drop back to its normal position before the end of the dwell $x$ of the holder-cam reaches the end of the tappet-rod 25.

It is next in order to describe the means whereby the developing-pan after reaching its horizontal position is supplied with developing fluid, since while this mechanism is brought into action before the described movements of the holder and pan are completed it is nevertheless the third mechanism brought into action by the rotation of the power-shaft.

Figures 1, 12:
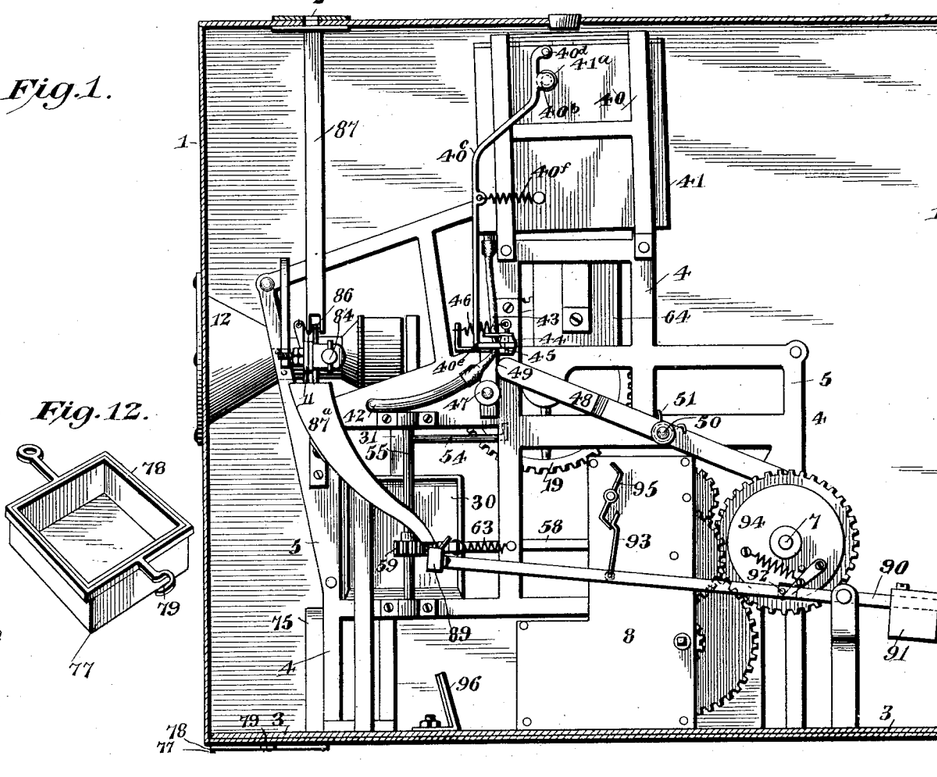
Figure 1 is a side elevation of the machine complete with one side of the casing removed.
Fig. 12 is a detail view of the fixing-tray.

Adjacent to the top of the machine-frame, at one side thereof, is secured a tank-support 40 of any suitable character, but preferably comprising a number of suitably-connected metal straps, as shown in Figs. 1 and 2. In this support is removably carried a tank or reservoir 41 for the developing fluid and provided with a discharge-tube 42, extending from the bottom thereof to a point immediately above the position occupied by the pan during the development of the plate. The discharge-tube 42 is provided with a collapsible valve or section 43, preferably of rubber or other suitable material, passed between a pair of hingedly-connected arms 44 and 45, constituting a valve-clamp, the arm 44 being rigidly attached to one side of the machine-frame (see Fig. 1) and the arm 45 being laterally movable and normally drawn toward the fixed arm by a spring 46 to collapse the tube-section 43, and thus prevent the escape of fluid from the reservoir. The inner or freely-movable end of the arm 45 is bent down, as indicated in Fig. 4, and is provided with a tappet 47, arranged to be engaged by the front end of a valve-lever 48, having its engaging end rounded, as indicated at 49, and fulcrumed intermediate of its ends upon a stud 50, projecting from the machine-frame. The front end of the valve-lever 48 is normally retained in an inoperative position by a spring 51, encircling the stud 50 and connected to the lever. This spring also retains an antifriction-roller 52, carried by the rear end of the lever in contact with the periphery of a valve-actuating cam 53. This cam is formed with a comparatively long dwell $x^2$, extending from $k$ to $l$, and with a rise extending from $l$ to $m$, from which latter point the cam has a drop to $k$. Normally the roller 52 is disposed intermediate of the ends of the dwell $x^2$, (see Fig. 4,) for the reason that the valve-lever is not intended to open the valve until the pan has reached its elevated position. As soon, however, as the pan and plate-holder have reached the developing position (shown in Fig. 7) the rise of the valve-actuating cam 53 will be presented to the roller 52, and as the shaft 7 continues to rotate the valve-lever 48 will be oscillated and will by the engagement of its front end with the tappet 47 effect a swinging movement of the arm 45 in opposition to the spring 46 to remove the constriction from the collapsible tube-section 43, and thus permit a predetermined quantity of the developing fluid to be discharged through the discharge-tube 42 and into the developing-pan 30.

It is desired to keep the tank 41 entirely closed except when it is necessary to permit the entry of sufficient air to facilitate the discharge of fluid therefrom. For this reason an air-nipple $41^a$, projecting from one side of the tank, is normally closed by an air-valve $40^b$, carried by air-valve lever $40^c$, fulcrumed at its upper end upon the tank, as indicated at $40^d$, and having its lower end $40^e$ disposed in operative relation with the movable arm 45 of the valve-clamp. The lever $40^c$ may be positively connected to the arm 45 for movement therewith in both directions; but it is preferably arranged as shown, so that it is swung by the arm to open the air-valve $40^b$ and is retracted by a spring $40^f$ to effect the closing of the air-valve when the arm 45 swings back to its normal position. By the time sufficient fluid has been discharged into the pan the roller 52 will have reached the drop of the cam 53, and as the valve-lever returns to its normal position the spring 46 will close the valve-clamp, and thus collapse the tube-section 43 to cut off further supply of the fluid. Simultaneously with the closing of the valve 43 the lever $40^c$ will swing back to close the air-valve $40^b$. The valve mechanism will now remain inactive during the remainder of the revolution of the shaft 7, for the reason that the roller 52 on the valve-lever will rest upon the dwell $x^2$ of the valve-actuating cam.

The next mechanism brought into action is that employed for the ejection of the developed plate from the holder. This mechanism comprehends an ejector 54 in the form of an arm extending laterally from the vertical ejector-shaft 55 and provided with an upturned engaging end 56, (see Figs. 4 and 8,) which when the shaft 55 is rotated engages the rear edge of the photographic plate in the holder and pushes it out of the guides immediately after the pan moves away from the holder and before the holder begins its retractile movement. The ejector-shaft 55 is rotated by a horizontal rack 57, formed at one end of a rack-bar 58 and meshing with a pinion 59 on the shaft 55. The rack-bar 58 is mounted in a guide 60, secured to the machine-frame, and upon its rear extremity is provided with a roller 61, engaging the periphery of the ejector-actuating cam 62 on the shaft 7. The cam 62 is provided with an extended dwell $x^3$, a rise $y^3$, and a drop $y^4$. The roller 61 normally engages the dwell of the cam and is not engaged by the rise thereof until the pan 30 begins to drop back to its normal position after the plate has been developed. As soon, however, as the pan has moved away from the holder the roller at the end of the rack-bar 58 is engaged by the rise of the cam 62, the rack-bar is moved longitudinally, and the ejector-shaft is thus rotated to swing the ejector in the direction of the arrow in Fig. 8. As soon as the ejector has passed beyond the front end of the plate-holder the latter, which is now empty, will swing back in the manner heretofore explained to the full-line position, (indicated in Fig. 9,) and as the drop of the cam $x^3$ will now have arrived opposite the roller 61 on the rack-bar 58 said rack-bar will be retracted by a retracting-spring 63 and the ejector will be swung back in an obvious manner to its normal position. (Indicated in Fig. 4.)

We have now seen how the plate after exposure is carried around to a horizontal position by the holder, how the developing-pan is elevated to receive the plate, the manner in which the developing fluid is automatically supplied to the pan, how the pan is dropped back to its normal position, the plate ejected from the holder, and the holder retracted to the receiving position. It is therefore in order to describe the means whereby a new plate is fed into the holder for presentation opposite the lens-tube for subsequent exposure.

Figure 3:
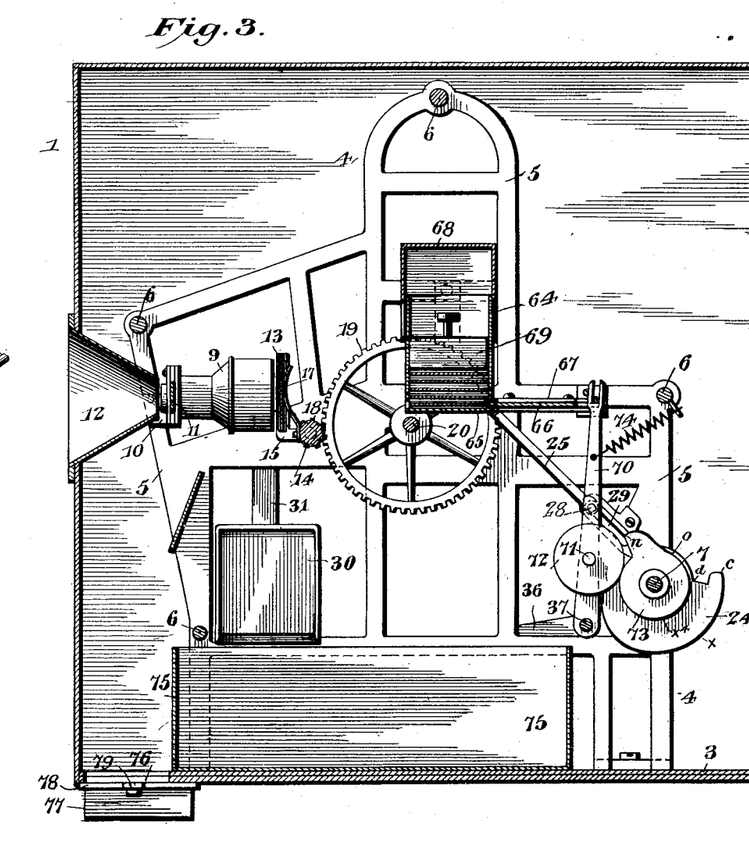
Fig. 3 is a central longitudinal section through the machine with certain of the parts shown in elevation.

As shown in Figs. 3 and 9, the plate-magazine 64 is supported between the side castings of the frame, with the surface of its bottom 65 in alinement with the guides 16 of the plate-holder when the latter is in the receiving position. A number of the plates are piled one above the other in the magazine and are designed to be pushed one at a time into the plate-holder by a plunger 66, movable across the bottom of the magazine and guided when retracted beyond the rear side thereof by guideways 67, extended back from the magazine and rigidly secured to the machine-frame. (See Fig. 3.)

In order to completely darken the magazine, so that the plates may not be injured by premature exposure, said magazine is provided with a cap or cover 68, and in order that the plates may feed downward with certainty a weight 69 is imposed upon the uppermost plate in the magazine.

The plunger 66 is designed to move forward to feed a plate from the magazine as soon as the plate-holder reaches the receiving position. To accomplish this purpose, the rear end of the plunger is pivotally connected to the upper extremity of a rocker-arm 70, loosely mounted at its lower end upon the shaft 37 and provided intermediate of its ends with a lateral stud 71, upon which is journaled an antifriction-disk 72, disposed to bear against the periphery of a plunger-operating cam 73 on the shaft 7. This cam is provided with a dwell $x^t$, extending from $n$ to $o$, and with a rise $y^5$, extending from $o$ to a drop terminating at $n$.

The normal position of the cam 73 is shown in Fig. 4, and it will be evident that the shaft 7 will almost have completed its rotation before the rise of the cam will engage the disk 72 to move the plunger forward. This movement will be effected, as heretofore stated, immediately upon the presentation of the plate-holder in the receiving position.

As soon as the plate has been received by the holder the end of the tappet-rod 25 will drop from the end of the dwell $y$ of the cam 24 to permit the movement of the plate-holder from the receiving position to its position opposite the lens-tube, and at the same time the disk 72 will have reached the drop of the cam 73 and the plunger will be retracted by a retracting-spring 74, secured at one end to the arm 70 and at its opposite end to one of the tie-bars of the frame.

Resting upon the base within the machine-frame is disposed a comparatively large waste-pan 75, into which the waste fluid is dumped from the developing-pan as the latter drops back to its normal position.

Adjacent to the front wall of the casing the base 3 and the bottom of the casing are cut away to form an opening 76, through which the ejected plate is precipitated into a fixing-tray 77, containing a fixing solution. The fixing-tray 77 is carried by an arm 78, having pivotal connection at its opposite end to the under side of the machine-casing, as shown. The tray is normally retained directly under the opening 76 by a catch 79, which latter may be readily released in order to permit the tray 77 to be swung beyond the front of the casing to facilitate the removal of the completed picture from the fixing-bath.

Having now described the entire machine so far as the mechanism for manipulating the plate is concerned, it remains to point out the manner in which the shutter 11 is operated to expose the plate and the provision which is made in the illustrated embodiment of the invention for effecting the coin control of the apparatus. The shutter 11 is in the form of a sliding plate provided with an opening, as usual, and retained in its closed position by a spring 80, which holds the shutter at one limit of its movement. An extended end of the shutter is provided with a pair of slots 81 for the reception of studs 82, projecting laterally from a plate 83, connected at its outer end to a shutter-operating handle 84, disposed upon the exterior of the casing. The extended end of the shutter and the plate 83 are each provided with a finger 85 or 86, between which a coin dropped through the coin-race 87 from the slot 2 is received. The coin when thus received between the fingers constitutes a connection between the plate 83 and the shutter, so that when the handle 84 is drawn out the shutter will be moved to its open position and the plate will be exposed. As soon as the shutter is open the coin drops from between the fingers 85 and 86 into a chute $87^a$ and the shutter is retracted to its closed position by the spring 80, the handle 84 being similarly retracted when released by the operator by a spring 88. From the chute $87^a$ the coin drops into a coin-receiver 89 upon the end of a swinging detent 90, provided with a counter-weight 91 and with two check-pins 92 and 93, the former being arranged to engage a notched check-wheel 94 on the shaft 7 and the latter to engage the governor-fan 95 of the motor 8. The coin deposited in the receiver 89 will overbalance the detent, swinging the latter down to disengage the pins 92 and 93, thus releasing the check-wheel and governor-fan and starting the machine. As the detent swings down the coin-ejector 96 will eject the coin from the receiver 89 and the detent will swing up. The pin 92, however, will rest against the periphery of the check-wheel, and the detent will thus be retained in an inoperative position until the shaft 7 has made one complete rotation, which, as we have seen, will effect the delivery of a photograph and the presentation of a plate opposite the lens-tube. As soon as the rotation of the shaft is complete the notch on the check-wheel 94 will be brought opposite the pin 92, permitting the weight 91 to swing up the detent to its checking position to stop the machine. As I have heretofore stated, however, this coin-operated controlling mechanism as such constitutes no part of my present invention, and for this reason it has not been described and illustrated with more particularity than is deemed necessary for the purposes of this disclosure. In fact, it is contemplated to have this machine controlled and operated by an attendant, and it will therefore be evident that a check control is not only unnecessary, but, as a matter of fact, the shaft 7 may be driven by a motor of any suitable character, or it may be provided at one end with an operating-crank 97, as illustrated in Fig. 13, this crank being located on the exterior of the casing and associated with a dial 98, provided with suitable designations which will apprise the operator of the operations be- ing performed by the machine in any given position of the crank.

Figure 11:
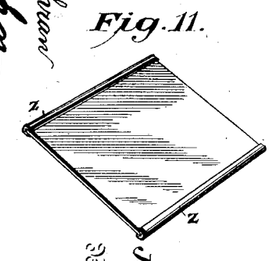
Fig. 11 is a detail view of one of the plates.

In Fig. 11 I have illustrated a special form of plate the use of which is contemplated. This plate is formed at its opposite edges with beads $z$, which may be constructed from separate strips of metal bent around the edges of the plate, as shown, or, if desired, the edges of the plate may be bent over toward the sensitive surface. These beads serve to space the plates which are stored in the magazine, so that injury to the sensitized surfaces thereof is prevented, and also to facilitate the engagement of the plates by the plunger.

Briefly, the operation of the machine is as follows: The coin is deposited in the slot 20 and dropping through the race 87 is received between the fingers of the shutter-slide. A pull upon the handle 84 will slide the shutter to its open position, thus exposing the plate retained opposite the lens-tube by the plate-holder. From the shutter-slide the coin drops through the chute 87 into the receiver 89 and depresses the front end of the detent 90 to release the operating mechanism. The power-shaft 7 now begins to rotate in the direction of the arrow in Fig. 4, and the coin having been ejected from the receiver by the ejector 96 the detent will be swung up by the weight 90 and the check-pin 92 will rest against the periphery of the check-wheel 94. As soon as the shaft 7 begins to rotate the plate-holder will begin to swing down in the direction of the dotted arrows in Fig. 7, and before its movement in this direction is complete the developing-pan 30 will begin to move up from its normal position to the position indicated in dotted lines in Fig. 6. The holder and pan will reach the position shown in Fig. 7 almost simultaneously, the plate-holder coming to rest slightly in advance of the pan. The collapsible valve 43 will now be open and will remain open just long enough to permit the necessary quantity of developing fluid to be discharged into the pan 30 from the tank 41. The plate-holder and pan will remain in the position indicated in Fig. 7 a sufficient length of time to permit the complete development of the plate, and at the expiration of such period the pan will begin to swing down to its normal position and the ejector 54 will be moved toward the plate in the holder and will be timed to engage the rear edge of said plate, as shown in Fig. 8, as soon as the pan is moved away from the holder. The pan will now continue to swing back and the movement of the ejector will be continued to effect the ejection of the plate from the holder, whence said plate will drop into the fixing-tray 77 for delivery to the purchaser. As soon as the ejector 54 has moved beyond the front end of the plate-holder the latter will swing back with a quick movement to the receiving position (indicated in full lines in Fig. 9) and the plunger 66 will begin its forward movement to push the bottom plate out of the magazine and into the holder, the ejector in the meantime being returned to its normal position. Upon the complete reception of the plate by the holder the latter will at once begin its upward movement to present the new plate opposite the lens-tube, and during this movement the retraction of the plunger 66 will be effected. Just as the plate-holder and plunger reach their normal positions (indicated in Fig. 4) the notch in the check-wheel 94 will arrive opposite the check-pin 92 on the detent, and the latter being constantly urged upward by the weight 91 will engage the check-wheel to stop the machine.

In conclusion, attention is directed to the fact that my apparatus comprehends the employment of a single developing-bath as distinguished from those constructions which include a number of baths in addition to the washing-trays necessarily employed when more than a single bath is used.

The machine also differs radically from ordinary constructions in the provision of a plate-holder constituting a carrier which positively carries the plate from the magazine to the lens-tube and thence to the developing-bath as distinguished from the provision of chutes for conveying the plate from one point to another and from carriers of complicated construction and intricacy of movement.

It is thought that from the foregoing the construction and operation of the apparatus will be clearly comprehended; but while the present embodiment of the invention is thought at this time to be preferable I desire to be distinctly understood as reserving the right to effect such changes, modifications, and variations of the illustrated structure as may come fairly within the scope of the protection prayed.

What I claim is—

1. In a photographic apparatus, the combination with a lens-tube, and magazine; of a plate-holder movable from the magazine to a position opposite the lens-tube, and mechanism for advancing the plate to the holder from the magazine and for thereafter moving the holder to its normal position opposite the lens-tube.

2. In a photographic apparatus, the combination with the lens-tube, and a magazine; of an oscillatory plate-holder movable from the magazine to a position opposite the lens-tube, means for advancing the plate to the holder from the magazine, means for thereafter oscillating the holder to present it opposite the tube, and an actuating device or motor common to the plate-advancing and holder-oscillating means.

3. In a photographic apparatus, the combination with the lens-tube and a magazine; of a plate-holder movable to transfer a plate from the magazine to a position opposite the lens-tube, means for moving the plate-holder in one direction, and holder-retracting means.

4. In a photographic apparatus, the combination with a lens-tube and a magazine; of a plate-holder, and means for moving said holder from a position opposite the lens-tube to the developing position, thence to the magazine, and finally from the magazine to its normal position opposite the lens-tube.

5. In a photographic apparatus, the combination with a lens-tube and a magazine; of a plate-holder, means for moving said holder from a position opposite the lens-tube to the developing position, and reactive means for retracting the holder first to the magazine and then to its normal position opposite the lens-tube.

6. In a photographic apparatus, the combination with a lens-tube and a magazine; of an oscillatory plate-holder, and operating mechanism for swinging the plate-holder from its normal position opposite the lens-tube to the developing position, thence to the magazine and back to its normal position, said mechanism including provision for intervals of rest to permit the development of a plate and the reception of a new plate by the holder.

7. In a photographic apparatus, the combination with a lens-tube and a magazine; of an oscillatory plate-holder, means for swinging said holder from its normal position opposite the lens-tube to the developing position, and reactive means for retracting the holder first to the magazine and then to its normal position opposite the lens-tube.

8. In a photographic apparatus, the combination with a lens-tube and a plate-holder movable upon an axis; of operating mechanism for moving the plate-holder upon its axis from a position opposite the lens-tube to a developing position and thence to the receiving position, said mechanism including provisions for intervals of rest to permit the development of a plate carried by the holder and the subsequent reception of a new plate by the holder when in the receiving position.

9. In a photographic apparatus, the combination with a lens-tube and a magazine, of a plate-holder arranged to transfer a plate from the magazine to a position opposite the lens-tube, cam-operated means for moving the plate-holder in one direction, and holder-retracting means.

10. In a photographic apparatus, the combination with a lens-tube and magazine, of an oscillatory plate-holder, gearing connected to the plate-holder to operate the same, and including a tappet-rod, a holder-operating cam disposed to move the rod, and means for retracting the plate-holder.

11. In a photographic apparatus, the combination with a lens-tube and magazine, of an oscillatory plate-holder provided with a pinion, a gear-wheel meshing with the pinion, a tappet-rod connected to the gear-wheel, a cam for operating the rod, and means for retracting the plate-holder.

12. In a photographic apparatus, the combination with the lens-tube and a magazine; of a plate-holder movable from a horizontal position opposite the magazine, to a vertical position opposite the lens-tube and thence to the developing position.

13. In a photographic apparatus, the combination with a lens-tube and a developing-tray, of an oscillatory plate-holder disposed to support a plate opposite the lens-tube for exposure, and movable from such position to a position opposite the developing-tray, said tray being movable to discharge the developing fluid after the plate has been developed.

14. In a photographic apparatus, the combination with a lens-tube, magazine and developing-tray, of a plate-holder movable from the magazine to the lens-tube and thence to the developing-tray.

15. In a photographic apparatus, the combination with a lens-tube, a magazine and developing-tray, of a plate-holder movable from a horizontal position opposite the magazine to a vertical position opposite the lens-tube and thence to a horizontal position opposite the developing-tray.

16. In a photographic apparatus, the combination with a lens-tube, magazine and developing-tray, of a plate-holder, means for moving said plate-holder from the magazine to the lens-tube, thence to the developing-tray and back to the magazine.

17. In a photographic apparatus, the combination with a lens-tube, magazine and a developing-tray, of an oscillatory plate-holder, and means for swinging the plate-holder from a horizontal position opposite the magazine to a vertical position opposite the lens-tube, and thence to a horizontal position opposite the developing-tray.

18. In a photographic apparatus, the combination with a lens-tube, magazine and tray; of an oscillatory plate-holder, and means for swinging the holder from a vertical position opposite the lens-tube to the tray and thence to a horizontal position opposite the magazine.

19. In a photographic apparatus, the combination with a horizontal lens-tube, a vertically-disposed magazine in rear thereof and a developing-tray below the tube, of an oscillatory plate-holder normally supporting the plate opposite the lens-tube, means for swinging the plate-holder to present the plate to the developing-tray, means for effecting the partial retraction of the plate-holder to present it in position opposite the magazine for the reception of a new plate, means for advancing a plate from the magazine to the holder, and means for completing the retraction of the holder to present the new plate opposite the lens-tube.

20. In a photographic apparatus, the combination with a lens-tube, a magazine and a developing-tray, of a plate-holder normally disposed in position to support a plate opposite the lens-tube, means for moving the plate-holder from the tube to the developing-tray, thence to a position opposite the magazine and back to the lens-tube, and means for advancing a plate to the holder when the latter is opposite the magazine.

21. In a photographic apparatus, the combination with a lens-tube, and a movable plate-holder normally supporting a plate opposite the tube; of a tray normally disposed in a substantially vertical inoperative position, and means for moving the tray to a horizontal operative position and for moving the plate-holder to locate a plate in the tray.

22. In a photographic apparatus, the combination with a lens-tube, of an oscillatory plate-holder, an oscillatory developing-tray, means for effecting the conjoint movement of the tray and holder to present the plate to the tray after exposure and means for thereafter moving the tray away from the holder to facilitate the ejectment of the plate.

23. In a photographic apparatus, the combination with a lens-tube; of a tray normally disposed in an inoperative position, an oscillatory plate-holder normally disposed opposite the lens-tube, means for moving the tray to an operative position and for swinging the plate-holder to locate a plate in the tray, and means for discharging fluid into the tray after the latter has reached its operative position.

24. In a photographic apparatus, the combination with a lens-tube, of an oscillatory tray normally disposed in a substantially vertical position, means for moving the tray to a horizontal position, means operative subsequent to such movement of the tray to supply the latter with fluid, and means for carrying a plate to the tray from a position opposite the lens-tube.

25. In a photographic apparatus, the combination with a lens-tube, of an oscillatory holder normally supporting a plate opposite the tube, an oscillatory developing-tray normally disposed in a substantially vertical position, means for effecting the conjoint movement of the tray and holder to present the tray in a horizontal position and to locate the holder within the tray, and means for supplying a predetermined quantity of developing fluid to the tray after the latter has reached its horizontal position.

26. In a photographic apparatus, the combination with a lens-tube, magazine and developing-tray, the latter normally occupying an inoperative position, of a plate-holder normally supporting a plate opposite the lens-tube, and operating mechanism arranged to effect the following movements of the parts, to wit: the conjoint movement of the tray and holder to present the tray in an operative position and to locate the plate in the tray, the retraction of the tray to its inoperative position, the subsequent movement of the plate-holder to a position opposite the magazine and the final movement of the holder from the magazine to its normal position opposite the lens-tube.

27. In a photographic apparatus, the combination with a lens-tube, a magazine, a movable developing-tray, and a movable plate-holder normally supporting the plate opposite the lens-tube, of a reservoir for the developing fluid, a discharge-pipe leading therefrom, valve mechanism, and operating mechanism arranged to effect the following movements of the parts in the recited order, to wit: the conjoint movement of the plate-holder and tray to present the plate in the tray for development, the operation of the valve mechanism to permit the discharge of the fluid to the tray, the retraction of the tray from the plate-holder, the movement of the plate-holder to the magazine to receive a new plate, and the subsequent movement of the plate-holder to its normal position opposite the lens-tube.

28. In a photographic apparatus, the combination with a lens-tube, of a plate-holder normally supporting a plate opposite the lens-tube, means for moving the plate-holder away from the lens-tube, and means for ejecting the plate from the holder.

29. In a photographic apparatus, the combination with a lens-tube, of a plate-holder normally occupying a vertical position opposite the lens-tube, a plate-ejector, and means for moving the plate-holder away from the lens-tube to a horizontal position in operative relation with the ejector.

30. In a photographic apparatus, the combination with a lens-tube, of a plate-holder normally supporting a plate opposite the lens-tube, a plate-ejector, means for moving the plate-holder away from the tube and into operative relation with the ejector, and means for returning the plate-holder to its normal position after the plate has been ejected.

31. In a photographic apparatus, the combination with a lens-tube, of a plate-holder normally supporting a plate opposite the lens-tube, a plate-ejector, means for moving the plate-holder into operative relation with the ejector, means for feeding a new plate to the holder, and means for returning the holder to its normal position.

32. In a photographic apparatus, the combination with a lens-tube, of a swinging plate-holder normally supporting a plate opposite the tube, means for swinging the plate-holder away from the tube, an ejector for ejecting the plate from the holder, and means for returning the plate-holder and ejector to their normal positions after the plate has been ejected.

33. In a photographic apparatus, the combination with a lens-tube, of a developing-tray movable into and out of its developing position, a plate-holder normally supporting a plate opposite the lens-tube and movable to the developing-tray, means for moving the tray away from the holder after the plate has been developed, and means for ejecting the plate from the holder while the latter is in the developing position.

34. In a photographic apparatus, the combination with a lens-tube, a plate-holder, a movable developing-tray and a plate-ejector, of means for presenting a plate to the tray by the conjoint movement of the tray and holder, means for moving the tray away from the holder when the plate has been developed, and means for thereafter moving the ejector to eject the plate from the holder while the latter is in the developing position.

35. In a photographic apparatus, the combination with a lens-tube, of a swinging plate-holder, a swinging tray, a swinging ejector, means for moving the tray and holder to present a previously-exposed plate to the tray, means for subsequently moving the tray away from the holder, for thereafter moving the ejector to eject the plate and for finally retracting the plate-holder.

36. In a photographic apparatus, the combination with a lens-tube, a plate-magazine, a movable tray, a movable plate-holder normally supporting a plate opposite the lens-tube, and a plate-ejector, of operating means for effecting the following operations, to wit: first, the movement of the holder and tray to present the exposed plate to the latter; next, the movement of the tray away from the holder; next, the movement of the ejector to eject the plate from the holder; next, the retraction of the holder to a position opposite the magazine, and finally, the movement of the holder from the magazine to a position opposite the lens-tube, and means for advancing a new plate to the holder when the latter is disposed opposite the magazine.

37. In a photographic apparatus, the combination with a lens-tube and magazine, of an oscillatory plate-holder normally supporting a plate opposite the lens-tube and movable to a horizontal position opposite the magazine, and a plunger movable to advance the plate from the magazine to the holder.

38. In a photographic apparatus, the combination with a lens-tube and magazine, an oscillatory plate-holder normally supporting a plate opposite the lens-tube, a plate-ejector, means for moving the plate-holder away from the tube and into operative relation with the ejector, means for operating the ejector to eject the plate from the holder, means for thereafter moving the holder to a position opposite the magazine, means for advancing a new plate into the holder, and means for returning the holder to its normal position.

39. In a photographic apparatus, the combination with a lens-tube, plate-magazine, plunger, movable plate-holder and movable tray, of a fluid-reservoir, valve mechanism controlling the discharge of fluid to the tray, and a plate-ejector, of operating mechanism arranged to effect the following operations in the recited order, to wit: the conjoint movement of the tray and holder to present the exposed plate to the tray, the operation of the valve mechanism to supply the tray with the developing fluid, the movement of the tray away from the holder, the movement of the ejector to eject the plate from the holder, the retraction of the holder to a position opposite the magazine and the simultaneous retraction of the ejector, the advance of the plunger to feed a new plate to the holder, and the simultaneous retraction of the plate-holder and plunger to their normal positions.

40. In a photographic apparatus, the combination with a lens-tube, plate-magazine, plunger, movable tray and plate-holder, of a plate-ejector, a reservoir for the developing fluid, valve mechanism controlling the discharge of the fluid to the tray, and operating mechanism common to the holder, tray, ejector, valve mechanism and plunger, said mechanism including an operating-shaft and a series of cams mounted on the shaft and each controlling the movement of one of said elements.

41. In a photographic apparatus, the combination with a lens-tube, a developing-tray and a plate-holder, of a reservoir containing fluid to be supplied to the tray, interdependent liquid and air valves controlling the egress of liquid from and the ingress of air to the reservoir, and means for operating one of the valves.

42. In a photographic apparatus, the combination with a lens-tube, and a movable plate-holder normally disposed in a substantially vertical position opposite the lens-tube; of a tray normally disposed in a substantially vertical inoperative position, and means for effecting the conjoint movement of the holder and the tray to present them in adjacent horizontal positions.

43. In a photographic apparatus, the combination with a horizontal lens-tube, a vertically-disposed magazine, and a developing-tray; of a plate-holder normally supporting the plate opposite the lens-tube, means for moving the plate-holder to present the plate to the developing-tray, means for effecting the partial retraction of the plate-holder to present it in position opposite the magazine for the reception of a new plate, means for advancing a plate from the magazine to the holder, and means for effecting the complete retraction of the holder to present the new plate opposite the lens-tube.

44. In a photographic apparatus, the combination with a horizontal lens-tube, a vertically-disposed magazine, and a tray; of an oscillatory plate-holder normally supporting the plate opposite the lens-tube, means for swinging the plate-holder to present the plate to the tray, means for effecting the partial retraction of the plate-holder to present it in position opposite the magazine and for completing the retraction of the holder to its normal position, and means for advancing a plate to the holder while the latter is opposite the magazine.

45. In a photographic apparatus, the combination with a casing having an opening in one of its walls, and a fixing-tray exterior to the casing and disposed to receive a plate passed through the opening; of a lens-tube, a plate-holder, a developing-tray and a plate-ejector located within the casing, and operating mechanism whereby the plate is carried from the lens-tube to the developing-tray for development and is then ejected from the holder to the fixing-tray.

In testimony that I claim the foregoing as my own I have hereto affixed my signature in the presence of two witnesses.

JAMES POWERS.

Witnesses:
ROBERT J. LOUIS,
FRANK E. CROUSE.